United States Patent
Kankanala et al.

(10) Patent No.: US 8,600,622 B2
(45) Date of Patent: Dec. 3, 2013

(54) INTELLIGENT ARRANGEMENT BUCKLE SWITCH FOR SEAT BELTS

(75) Inventors: Sundeep Venkat Kankanala, Ann Arbor, MI (US); Stephen William Rouhana, Plymouth, MI (US); Dean M. Jaradi, Macomb, MI (US); Joseph Zwolinski, Sterling Heights, MI (US); Alex Meduvsky, Romeo, MI (US); Keith Ball, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 953 days.

(21) Appl. No.: 11/927,898

(22) Filed: Oct. 30, 2007

(65) Prior Publication Data

US 2009/0112408 A1   Apr. 30, 2009

(51) Int. Cl.
*B60R 22/48* (2006.01)

(52) U.S. Cl.
CPC ..................... *B60R 22/48* (2013.01)
USPC ............. 701/45; 701/46; 340/457.1; 180/271

(58) Field of Classification Search
CPC ..................................................... B60R 22/48
USPC ............. 701/46, 45; 180/268, 269, 270, 271, 180/273; 340/425.5, 438, 984, 945, 457, 340/457.1
See application file for complete search history.

(56) References Cited

U.S. PATENT DOCUMENTS

| | | | |
|---|---|---|---|
| 3,815,086 A * | 6/1974 | Minton et al. ................. | 180/270 |
| 4,060,878 A | 12/1977 | Dyki | |
| 4,163,128 A | 7/1979 | Miskowicz | |
| 4,346,778 A * | 8/1982 | Bluggel et al. ................. | 180/268 |
| 4,489,804 A * | 12/1984 | Kamijo .......................... | 180/268 |
| 4,519,652 A * | 5/1985 | Kamijo .......................... | 297/477 |
| 4,866,823 A | 9/1989 | Magnien et al. | |
| 4,920,629 A | 5/1990 | Perdue et al. | |
| 5,221,918 A * | 6/1993 | Boehner ........................ | 340/459 |
| 5,454,591 A * | 10/1995 | Mazur et al. .................. | 280/735 |
| 5,482,314 A | 1/1996 | Corrado et al. | |
| 5,626,359 A * | 5/1997 | Steffens et al. ............... | 280/735 |
| 5,906,393 A * | 5/1999 | Mazur et al. .................. | 280/735 |
| 5,949,340 A * | 9/1999 | Rossi ........................... | 340/573.1 |
| 6,104,293 A * | 8/2000 | Rossi ........................... | 340/573.1 |
| 6,362,734 B1 * | 3/2002 | McQuade et al. .......... | 340/457.1 |
| 6,381,315 B1 | 4/2002 | Nhaissi | |
| 6,623,032 B2 | 9/2003 | Curtis et al. | |
| 6,719,325 B2 * | 4/2004 | Ingemarsson ................. | 280/735 |
| 6,769,716 B2 * | 8/2004 | Rouhana et al. ............. | 280/806 |
| 6,773,075 B2 * | 8/2004 | Rouhana et al. ............. | 297/484 |
| 6,792,342 B2 * | 9/2004 | Breed et al. ..................... | 701/45 |
| 6,817,629 B2 * | 11/2004 | Herberg et al. ............ | 280/801.1 |
| 6,950,022 B2 | 9/2005 | Breed | |
| 7,011,341 B2 * | 3/2006 | Herberg et al. ............... | 280/807 |

(Continued)

*Primary Examiner* — John Q Nguyen
*Assistant Examiner* — Michael Whalen
(74) *Attorney, Agent, or Firm* — Shook, Hardy & Bacon, LLP

(57) ABSTRACT

A buckle switch arrangement for a multi-point seat belt system. A restraints control module is provided to receive signals from sensors operatively associated with the vehicle seat which determine and identify seat occupancy and also to receive signals from other sensors operatively associated with the vehicle seat which sense seat belt webbing payout. The signals obtained by the restraints control module are interpreted and, based on the interpretation, a telltale device may be activated to warn the vehicle operator that a seat occupant is not in compliance with seat belt usage.

12 Claims, 2 Drawing Sheets

(56) References Cited

U.S. PATENT DOCUMENTS

| | | | |
|---|---|---|---|
| 7,163,075 B2* | 1/2007 | Gray | 180/273 |
| 7,661,504 B2* | 2/2010 | Odate | 180/270 |
| 7,664,585 B2* | 2/2010 | Odate | 701/45 |
| 7,766,389 B2* | 8/2010 | Odate | 280/806 |
| 7,769,513 B2* | 8/2010 | Breed et al. | 701/45 |
| 8,195,365 B2* | 6/2012 | Bernhagen et al. | 701/45 |
| 2003/0036835 A1* | 2/2003 | Breed et al. | 701/45 |
| 2005/0206152 A1* | 9/2005 | Delventhal et al. | 280/805 |
| 2006/0000657 A1* | 1/2006 | Gray | 180/286 |
| 2006/0119091 A1* | 6/2006 | Takao et al. | 280/801.1 |
| 2007/0082747 A1* | 4/2007 | Smith et al. | 472/59 |
| 2007/0096447 A1* | 5/2007 | Tabe | 280/735 |
| 2007/0239331 A1* | 10/2007 | Kaplan | 701/36 |
| 2007/0246924 A1* | 10/2007 | Eckelberg | 280/743.2 |
| 2007/0282505 A1* | 12/2007 | Bolton et al. | 701/45 |
| 2007/0284868 A1* | 12/2007 | Odate | 280/801.1 |
| 2008/0246316 A1* | 10/2008 | Carine et al. | 297/216.11 |
| 2009/0005937 A1* | 1/2009 | Odate et al. | 701/46 |
| 2009/0058627 A1* | 3/2009 | Shin | 340/457.1 |
| 2009/0096624 A1* | 4/2009 | Stengel et al. | 340/641 |
| 2009/0199661 A1* | 8/2009 | Skarpil | 73/862.391 |
| 2010/0114436 A1* | 5/2010 | Bernhagen et al. | 701/45 |

* cited by examiner

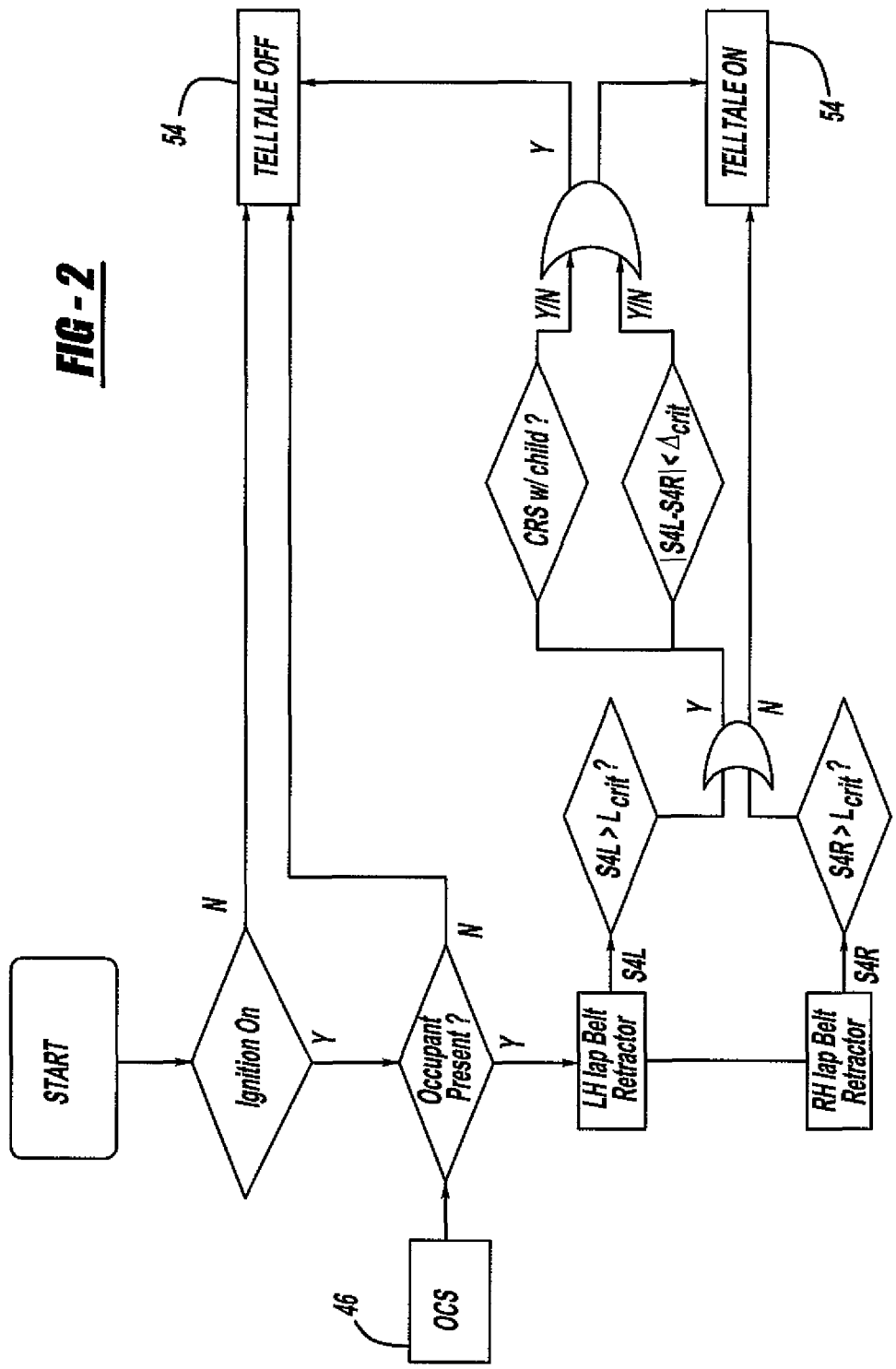

INTELLIGENT ARRANGEMENT BUCKLE SWITCH FOR SEAT BELTS

TECHNICAL FIELD

A buckle switch arrangement for seat belts is provided. The arrangement includes a device in the nature of a Hall effect sensor coupled with the seat belt retractor for sensing the amount of seat belt extracted. Information regarding the belt payout is relayed to a module to determine if the belt is being worn properly and may also determine if a telltale indicating non-compliance of seat belt usage or incorrect seat belt usage should be illuminated.

BACKGROUND OF THE INVENTION

Automotive vehicles incorporate a variety of restraint systems to provide for the safety of occupants. For example, it is known in the vehicle art to provide various types of seat belts or restraint systems for restraining an occupant in his or her seat and for providing controlled deceleration of the occupant from an event such as a collision. Various types of seat belts and restraint systems have been used in automobiles, trucks, and other vehicles and are commonly known today.

Known seat belt systems typically used in commercially available production vehicles include a seat belt telltale that is visible to the driver. The seat belt telltale is illuminated in the event that a seat belt is not being used in 3-point seat belt systems for some time.

A commonly used telltale arrangement includes an electrical switch in the buckle that senses engagement between the tongue or latchplate and the buckle. This arrangement identifies the buckle status and, hence, seat belt usage. Non-compliance with seat belt usage results in a signal light being illuminated on or near the instrument cluster. This signaling is initiated when associated electrical information (e.g., voltage) is transmitted using a wiring harness attached to the buckle assembly and subsequently used (e.g., by a Restraints Control Module [an "RCM"]) to determine if the telltale should be illuminated. Examples of buckle switch systems may be found in U.S. Pat. Nos. 4,060,878, 4,163,128, 4,920, 629, and 6,381,815.

An alternate method for sensing seat belt use compliance is an arrangement that is used to determine if the amount of extraction of webbing from the seat belt retractor is greater than a minimum amount that would indicate seat belt usage. This is commonly done using a mechanical device in the retractor which determines the number of revolutions of the retractor spool and hence the amount of webbing extracted. An example of this arrangement may be found in U.S. Pat. No. 4,866,223.

While the above-cited references provide certain advancement in the state of the art of systems for detecting and relaying information relative to seat belt use compliance, opportunities for improving such systems yet exist.

BRIEF DESCRIPTION

The disclosed embodiments of the invention are generally directed to a buckle switch arrangement for a multi-point seat belt system. The embodiments are all directed to a system that determines and relays the status of seat belt usage. The present invention finds particular application with a four-point seat belt system but could also be used with any multi-point seat belt system using one or more retractors. The arrangement includes an occupant seat in a vehicle, a seat belt arrangement operatively associated with the seat, at least one seat belt retractor with which at least one seat belt of the seat belt arrangement is operatively associated, and a feedback sensor associated with the seat belt retractor. The system further includes a seat occupancy sensor which senses occupancy of the seat. A restraints control module is provided to receive signals from the feedback sensor and from the occupancy sensor. The signals obtained by the restraints control module are interpreted by algorithmic analysis and, based on the interpretation, a telltale device may be activated to warn the vehicle operator that a seat occupant is not in compliance with seat belt usage or is using the seat belt incorrectly.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 2 is an algorithm which accompanies the arrangement of FIG. 1.

DETAILED DESCRIPTION OF THE PREFERRED EMBODIMENT

Figure 1:
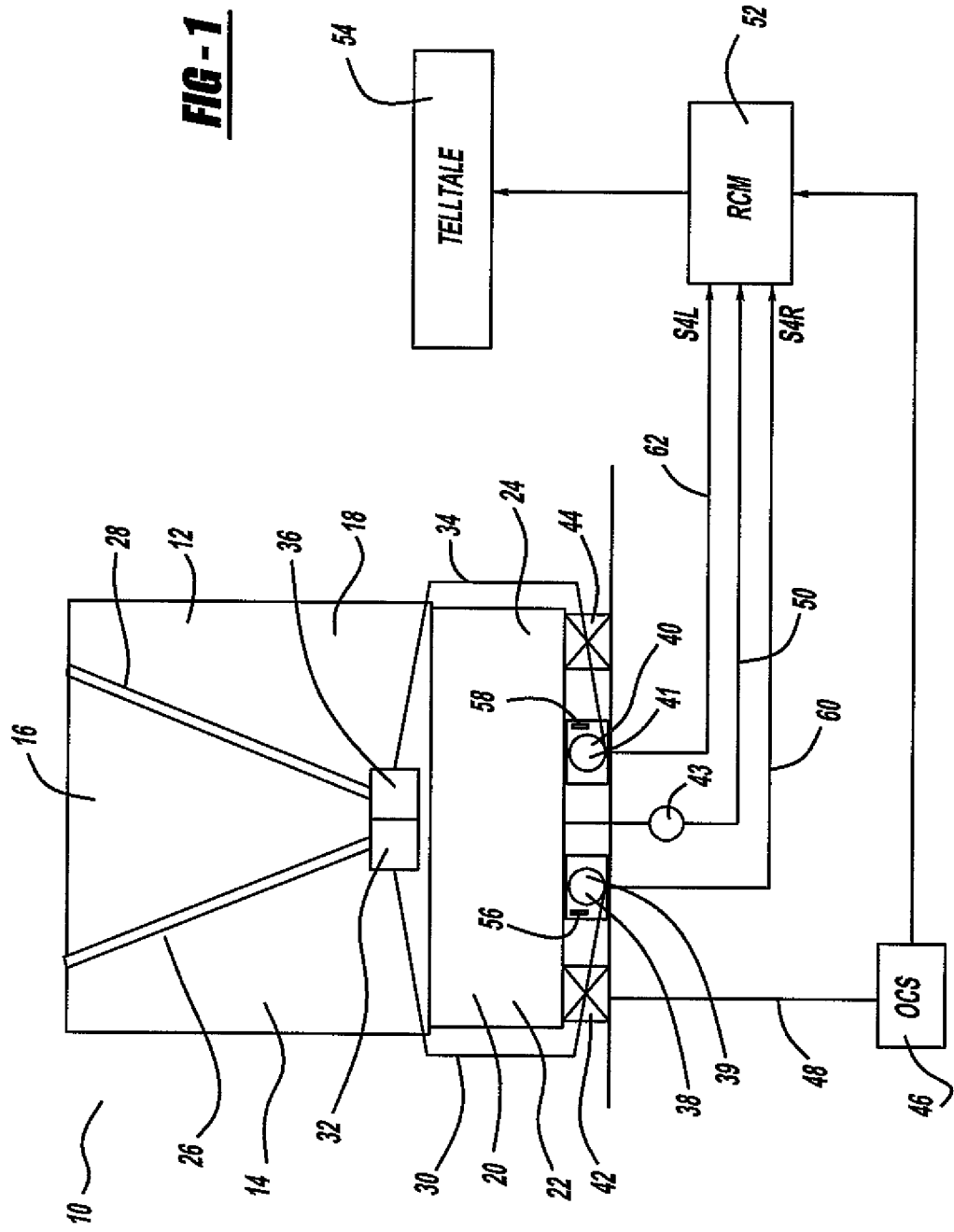
FIG. 1 illustrates a stylized view of the intelligent arrangement buckle switch for seat belts as set forth herein.

In the following figures, the same reference numerals will be used to refer to the same components. In the following description, various operating parameters and components are described for one constructed embodiment. These specific parameters and components are included as examples and are not meant to be limiting.

The four-point seat belt restraint system 10 includes a first, or inboard, shoulder belt webbing 26 extending from the top portion 16 to the bottom portion 18 of the seat back 14 adjacent the inboard side 22 of the seat cushion 20. The four-point seat restraint system 10 further includes a second, or outboard, shoulder belt webbing 28 extending from the top portion 16 to the bottom portion 18 of the seat back 14 adjacent the outboard side 24 of the seat cushion 20. The four-point seat belt restraint system 10 further includes a first, or inboard, lap belt webbing 30 extending from the inboard side 22 of the seat cushion 20 to a buckle/tongue 32 (which may be either a tongue or a buckle) and a second, or outboard, lap belt webbing 34 extending from the outboard side 24 of the seat cushion 20 to a tongue/buckle 36 (which may be either a buckle or a tongue). The first lap belt webbing 30 is anchored to the seat 12 by a retractor 38 having a retractor spool 39. The retractor 38 is anchored to the seat by fasteners including bolts, welds and the like. The second lap belt webbing 34 is anchored to the seat 12 by a retractor 40, also attached to the seat 12 by the mentioned fasteners. The retractor 40 includes a spool 41. When the first shoulder belt webbing 26, the second shoulder belt webbing 28, the first lap belt webbing 30, and the second lap belt webbing 34 are donned and the buckle/tongue 32 and the tongue/buckle 36 are attached, the assembled buckle/tongue 32 and tongue/buckle 36 are ideally located across the centerline of the occupant (not shown).

In particular, the lap belt retractors 38 and 40 (as well as the shoulder belt retractors) may even be attached to the body structure in so-called body mounted systems. The present invention easily extends such a body mounted system if additionally a sensor 43 is provided to measure fore and aft seat travel (if the seat is movable). This information is processed together with the lap retractor webbing information to determine occupant presence and the like.

The retractors 38 and 40 may be positioned in a variety of places relative to the seat 12, but are shown herein in their preferred positions substantially under the seat 12. The illustrated under-seat location of the lap belt retractors 38 and 40 under the seat makes packaging of the retractors easier and more economical, particularly in vehicles where seat-to-tunnel or seat-to-door spacing is restricted.

The first shoulder belt webbing 26 is releasably attachable to the buckle/tongue 32 and the second shoulder belt webbing 28 is releasably attachable to the tongue/buckle 36. The buckle/tongue 32 is releasably attachable to the tongue/buckle 36. This arrangement results in the illustrated V-shape defined by the substantial convergence of the first shoulder belt webbing 26 and the second shoulder belt webbing 28 at the buckle/tongue 32 and the tongue/buckle 36. The first shoulder belt webbing 26 and the second shoulder belt webbing 28 have a large lateral spacing as illustrated from the occupants neck (not shown) while still providing effective support by the convergence along the centerline of the occupant at the area of the buckle/tongue 32 and the tongue/buckle 36. This increased lateral spacing at the upper part of the seat 12 increases occupant comfort for occupants of different sizes, including smaller occupants having smaller necks, narrower shoulders and shorter upper torso eights. This geometry also aids in keeping seat belts on the occupant's shoulders at all times, while lowering the risk of soft tissue neck injury and enhancing comfort for wide range of occupant builds.

It is to be understood that the buckle arrangement illustrated in FIG. 1 may be altered so that, for example, the buckle component is provided on the shoulder webbing. The configuration shown is intended as being illustrative and not limiting.

The first shoulder belt webbing 26 and the second shoulder belt webbing may be anchored to the seat 12 by separate or a single retractor (neither shown) fixedly secured to the seat 12 by fasteners including bolts, welds and the like. Alternatively, the retractor may be mounted on the body as in known body-mounted systems.

The restraint system 10 is fitted with an occupant sensing and identification system for determining whether or not the seat 12 is occupied. The occupant sensing and identification system also functions to determine whether the occupant is a child in a Child Restraint Seat (CRS). The occupant sensing and identification system includes a first of two occupant sensing and identification sensors 42 operatively associated with the seat 10. The occupant sensing and identification system further includes a second of two occupant sensing and identification sensors 44 also operatively associated with the seat 10. When activated, the first occupant sensing and identification sensor 42 and the second occupant sensing and identification sensor 44 provide an electrical signal to an Occupant Classification System (OCS) unit 46 via a first conduit 48 connected between the first occupant sensing and identification sensor 42 and the OCS unit 46 and via a second conduit 50 connected between the second occupant sensing and identification sensor 44 and the OCS unit 46. The OCS unit 46 then analyzes the received electrical signal and, if appropriate, sends a corresponding electrical input signal of a sufficient and pre-established value to a Restraints Control Module 52 which interprets the information received from the OCS unit 46 and generates, if appropriate, an electrical signal to a telltale device 54 as will be discussed in greater detail below. The telltale device 54 may produce a visual signal, an audio signal, or both.

The RCM 52 uses an algorithm to determine whether or not the telltale device 54 should be activated. While a number of related algorithms may be used to determine the nature of the seat belt usage, a preferred algorithm to effect this purpose is set forth in FIG. 2. According to this algorithm, the initial inquiry is whether or not the ignition of the vehicle is on. If the ignition is not on, then no signal is sent to the telltale device 54. If the ignition is on, then an inquiry is made whether or not an occupant is present, as sensed by the sensors 56 and 58 and as interpreted by the OCS 46. In the event that it is determined that no occupant is present, then no signal will be sent to the telltale device 54.

Is an Occupant Present?

If it is determined that an occupant is present in the seat, then two inquiries are made, both with respect to whether or not the lap belt webbing has been extracted far enough from the retractor to confirm proper seat belt utilization.

Is the Occupant an Adult or a Child?

If the determination is "yes" then two further inquires will be made. One inquiry is whether or not a child restraint seat (CRS) is present with a child seated therein. If the answer is "yes," then no signal will be sent to the telltale device 54. If, however, the answer is "no" (indicating that a child restraint seat is present but the seat is unrestrained), then an activation signal will be sent to the telltale device 54.

The other inquiry is whether or not the webbing from the lap belt retractor has been withdrawn far enough to confirm that the seat belt is, in fact, being properly used. If the answer to this is "yes" and if the difference in the length of belt webbing exhausted from each retractor is less than or equal to a predetermined amount (for example, 2.0"), then no signal will be generated. If, on the other hand, the answer to the first question is "yes" and the difference in extracted belt webbing is greater than the predetermined amount, then a signal will be generated.

If, however, the answer to the original inquiry (regarding the sufficiency of webbing length extracted from the lap belt retractor) is "no," then an activation signal will be sent to the telltale device 54.

The possible conditions (other than the ignition being "off") are summarized in Table 1. The algorithm is used to determine the following classifications:

(1) no occupant (2) occupant (not in CRS) buckled, with buckle in proper position (correct zone)

(3) occupant (not in CRS) buckled, with buckle out of zone (4) occupant (not in CRS) not buckled (5) occupant in restrained CRS (6) occupant in unrestrained CRS In the event that conditions (3), (4), or (6) exist, the RCM 52 will send an activating signal to the telltale device 54. In the event that conditions (1), (2) or (5) are determined to exist, no such signal will be sent.

TABLE 1

| Condition | Description | Occupant? (sensed by OCS) | Seatbelt "buckled"? | Child seat (with child)? (sensed by OCS) | Buckle within zone? | Telltale |
|---|---|---|---|---|---|---|
| 1 | No occupant | N | Y/N | N | Y/N | Off |
| 2 | Occupant (not in CRS) buckled, with buckle in zone | Y | Y | N | Y | Off |
| 3 | Occupant (not in CRS) buckled, with buckle out of zone | Y | Y | N | N | On |
| 4 | Occupant (not in CRS) not buckled | Y | N | N | N/A | On |
| 5 | Occupant in restrained CRS | Y | Y | Y | Y/N | Off |
| 6 | Occupant in unrestrained CRS | Y | N | Y | N/A | On |
| 7 | Occupant in booster | Y | N | Y | N/A | On |
| 8 | Occupant in booster | Y | Y | Y | N | On |
| 9 | Occupant in booster | Y | Y | Y | Y | Off |

NOTE 1:
Above assumes "Ignition On". For the trivial case of "Ignition Off" the telltale will be "OFF"
NOTE 2:
Above also assumes that if webbing >$L_{crit}$ is pulled out of either retractor => "buckled" state.
NOTE: 3:
"Null" signal treated as "No"
NOTE 4:
Assume whenever a CRS is present it is restrained by the seatbelt system. Hence a typical booster seat would not be treated as a CRS by this algorithm.

According to the present invention, a solution to known problems associated with non-compliance with seat belt usage requirements is presented in an efficient and cost-effective manner. The vehicle operator will immediately know if a passenger is not wearing a seatbelt or if a passenger is wearing a seat belt but the seat belt buckle is outside of the preferred zone for effective wearing. The present invention also provides information to the vehicle operator as to whether or not a child is in an unrestrained child restraint seat.

What is claimed is:

1. A system that detects whether a seatbelt-usage indication should be presented, signaling that a seatbelt is not being used in a predetermined manner, the system comprising:
   a seat;
   a seat belt arrangement operatively associated with said seat;
   a seat belt retractor, said seat belt arrangement being operatively associated with said seat belt retractor;
   a belt webbing operatively associated with said seat belt retractor;
   a feedback sensor operatively associated with said seat belt retractor, said feedback sensor detecting an amount of belt webbing paid out from the seat belt retractor;
   a restraints control module operatively associated with said feedback sensor, wherein the restraints control module determines whether the seatbelt is being used in the predetermined manner; and
   a seat belt position status telltale indicator operatively associated with said restraints control module, wherein the restraints control module executes an algorithm to determine whether a signal of the seat belt position status telltale indicator should be emitted, and wherein the algorithm includes:
   detecting that the seat is occupied,
   determining that the seatbelt arrangement is buckled,
   determining that the amount of the belt webbing that is paid out exceeds a predetermined threshold,
   determining whether a child restraint seat is detected on the seat,
   if the child restraint seat is not detected, in response to determining that the predetermined threshold is exceeded, not preventing the seat belt position status telltale indicator from emitting a signal, and
   if the child restraint seat is detected and the predetermined threshold is exceeded, preventing the seat belt position status telltale indicator from emitting the signal.

2. The system of claim 1, said seat belt retractor including a rotatable retractor spool to which said belt webbing is attached, wherein said feedback sensor senses rotation of said rotatable retractor spool.

3. The system of claim 1, wherein said feedback sensor senses webbing payout by way of a signal selected from the group consisting of electromagnetic, mechanical and chemical signals.

4. The system of claim 1, wherein said seat belt arrangement further includes a lap belt.

5. The system of claim 4, said lap belt including a retractor.

6. The system of claim 1, further including a seat occupancy sensor operatively associated with said seat.

7. The system of claim 1, said seat belt retractor being attached to said seat.

8. The system of claim 1 further comprising, a support structure adjacent to said seat and wherein said retractor is attached to said adjacent support structure.

9. A system that detects whether a seatbelt-usage indication should be presented signaling that a seatbelt is not being used in a predetermined manner, the system comprising:
- a seat belt arrangement operatively associated with a seat, said seat belt arrangement including the seat belt;
- a seat belt retractor operatively associated with said seat belt;
- a payout sensor operatively associated with said seat belt retractor, the payout sensor measuring an amount of the seatbelt that is paid out from the seat belt retractor;
- a restraints control module operatively associated with said payout sensor; and
- a seat belt position status telltale indicator operatively associated with said restraints control module, wherein the restraints control module executes an algorithm to determine whether a signal of the seat belt position status telltale indicator should be emitted, and wherein the algorithm includes:
  - detecting that the seat is occupied,
  - determining that the seatbelt is buckled,
  - determining that the amount of the seatbelt that is paid out exceeds a predetermined threshold,
  - determining whether a child restraint seat is detected on the seat,
  - if the child restraint seat is not detected, in response to determining that the predetermined threshold is exceeded, not preventing the seat belt position status telltale indicator from emitting a signal, and
  - if the child restraint seat is detected and the predetermined threshold is exceeded, preventing the seat belt position status telltale indicator from emitting the signal.

10. The system of claim 9, in which said sensor system includes a seat occupancy sensor operatively associated with the seat to determine if an occupant is present in the seat.

11. The system of claim 9, wherein said seat belt arrangement further includes at least one lap belt and wherein said at least one lap belt includes one of said retractors.

12. A method for detecting whether a seatbelt-usage indication should be presented, signaling that a seatbelt of a transportation mode is not being used in a predetermined manner, the method comprising:
- detecting that an determining ignition system of the transportation mode is on;
- detecting that an occupant is in the seat;
- detecting that an amount of payout of the seatbelt from a seatbelt retractor exceeds a predetermined threshold;
- determining whether a child restraint seat is detected;
- if the child restraint seat is not detected, in response to detecting that the amount of payout exceeds the predetermined threshold, not preventing a seat belt position status telltale indicator from emitting a signal; and
- if the child restraint seat is detected and the predetermined threshold is exceeded, preventing the seat belt position status telltale indicator from emitting the signal.

* * * * *